United States Patent [19]

Rhodes et al.

[11] Patent Number: 4,896,290
[45] Date of Patent: Jan. 23, 1990

[54] METHOD FOR ROUTING EVENTS FROM KEY STROKES IN A MULTI-PROCESSING COMPUTER SYSTEMS

[75] Inventors: Deborah A. Rhodes, Waltham, Mass.; Eric Rustici; Kelly H. Carter, both of Londonderry, N.H.

[73] Assignee: Wang Laboratories, Inc., Lowell, Mass.

[21] Appl. No.: 88,936

[22] Filed: Aug. 24, 1987

[51] Int. Cl.⁴ .......................... G06F 3/23; G06F 9/46
[52] U.S. Cl. ................. 364/900; 364/927.63; 364/928.6; 364/928; 364/942; 364/942.2; 364/948.3; 364/948.32; 364/521; 340/721
[58] Field of Search ... 364/200 MS File, 900 MS File, 364/300

[56] References Cited

U.S. PATENT DOCUMENTS

| | | | |
|---|---|---|---|
| 4,253,145 | 2/1981 | Goldberg | 364/200 |
| 4,385,366 | 5/1983 | Housey, Jr. | 364/900 |
| 4,470,038 | 9/1984 | Amano et al. | 340/711 |
| 4,500,386 | 10/1985 | Hirosawa et al. | 364/900 |
| 4,555,775 | 11/1985 | Pike | 364/900 |
| 4,658,351 | 4/1987 | Teng | 364/200 |
| 4,719,566 | 1/1988 | Kelley | 364/200 |
| 4,733,351 | 3/1988 | Peirent | 364/200 |
| 4,761,642 | 8/1988 | Huntzinger | 340/721 |

Primary Examiner—Raulfe B. Zache
Assistant Examiner—Robert B. Harrell
Attorney, Agent, or Firm—Michael H. Shanahan

[57] ABSTRACT

A computer system in which multiple processes may run concurrently includes a window manager for displaying windows associated with different processes. One of the processes represented by a window may be designated as active. Keystrokes are translated by a keyboard driver to events represented by keycodes. The keycodes are routed to processes with which they are associated by reference to a routing table. Unless otherwise indicated, a keycode is routed to the active process. Where a keycode is associated with and transferred to the window manager, subsequent keycodes are stored in a typeahead buffer. The window manager may modify the routing table. After completion of the window manager operation, all keycodes remaining in the buffer are routed to their associated processes as determined by the modified routing table.

8 Claims, 5 Drawing Sheets

METHOD FOR ROUTING EVENTS FROM KEY STROKES IN A MULTI-PROCESSING COMPUTER SYSTEMS

BACKGROUND OF THE INVENTION

1. Field of the Invention

This invention is related to multi-processing computer systems, and more particularly to a means and method of routing keyboard and other input events in such a system.

2. Description of Related Art

Computer systems in which several different programs or processes run concurrently are becoming more common. These processes may take the form of multiple application programs and may also include additional segments of executable code which form part of the operating system but which run independently, similar to applications programs.

Controlling and directing input data in a computer system in which multiple-processes run concurrently poses many problems compared to a system in which only a single process runs at any one time. One particular problem faced by such multi-processing systems is controlling the input from a user and directing it to the appropriate program or system function. Typically, user input is provided by a keyboard, mouse-type device, touch screen, or other similar input device. For example, when a user types one or more keys at a keyboard, this input data may be intended for any of several different programs or processes. A user running a word processing program, for example, might type letter keys to indicate input to the word processing program, other function keys to indicate to the system that certain parameters, such as window size, are to be changed, and still other keys to select another application program as the currently active program. Thus, a method of processing the input from a user and ensuring that that input is directed to the appropriate computer process is necessary in computers running concurrent programs and processes.

Additionally, in a multi-processing system, each process or program runs only during a small portion of the time. Multiple programs are implemented by dividing the central processor time up into incremental portions and allowing individual programs and processes different amounts of this time. As a result, an application which has been inactive for a period of time may have several different input events of various levels of urgency waiting for it when it again becomes active. It is desirable to allow a program or process to selectively process these input event in an order which may not be the same as the order in which they occurred or the order in which they are "queued" by the computer system.

SUMMARY OF THE INVENTION

The present invention includes a method of inputting to a program or virtual process information from an external source such as another independently running process or an I/O device. All information is transmitted to a program by means of events. Events are placed in an event queue for the program and may be selectively retrieved by the program. In retrieving the events, a program may ask for the next event, or may specify with varying degrees of particularity a particular type of event or events which it wishes to receive next.

User input such as that from a keyboard or mouse-type device, is treated specially to insure that the input goes to the proper program in a multi-processing environment. The present invention includes a keyboard driver which has the capacity to use individual translation tables for each individual application program which is running. User input from user activated devices, such as a keyboard or mouse, are combined with input from other parts of the systems by an input funnel which insures that user input is routed to the proper destination. The input funnel operates in conjunction with a window manager to allow a user to type a sequence of keys which may be directed to several different programs which are running.

DESCRIPTION OF THE DRAWINGS

The advantages and operation of the present invention will be more fully understood upon reading the following description of the preferred embodiment in conjunction with the accompanying figures of which.

DESCRIPTION OF THE PREFERRED EMBODIMENT

Figure 1:
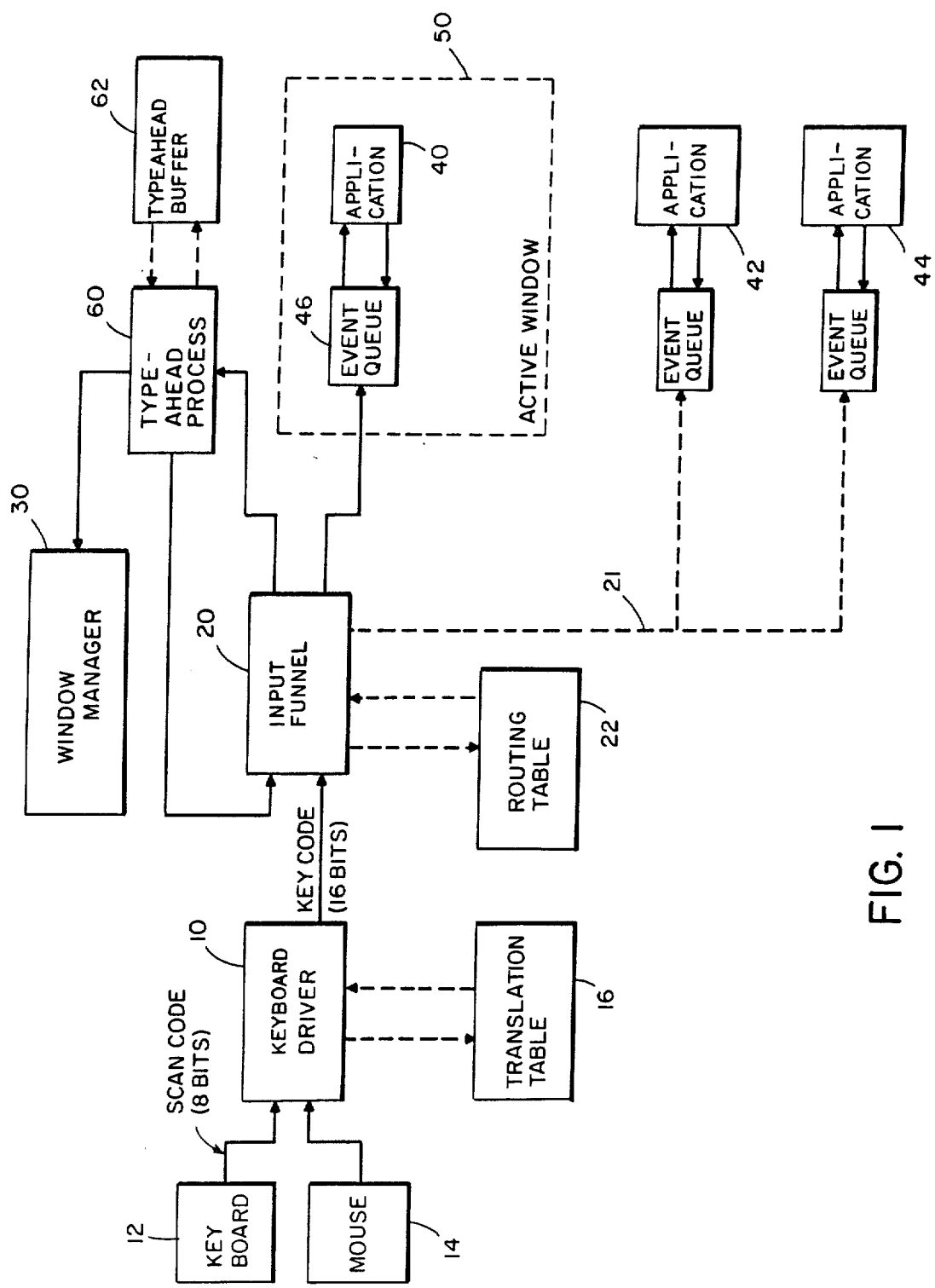
FIG. 1 is a block diagram useful in explaining the data flow between the various parts of a computer system operating in accordance with the invention.

Before proceeding to describe the present invention, it will be useful to define and explain some terms used in the following explanation. As used herein, the term "process" refers to a segment of executable code for which the operating system maintains a virtual environment. Each application program which is running is an individual process. The operating system would include a number of individual processes performing different functions necessary for the operation and integration of the systems. The processes might include, for example, device drivers, a window or display manager process, a communications buffering process, and others.

An "event" is a data structure that indicates to a process that some action external to that process has occurred. Events may take many forms. Keystrokes, mouse movements, file I/O data, and timeout indications are examples of events. Typically, a process will send and receive many different types of events. For example, a word processor would receive keyboard and mouse events from a user indicating the desired functions to be performed on a piece of text. If the word processor were to read data from a disk storage unit, it would receive an event which informs it that the file transfer is complete. To print a document, the word processor could send an event to the operating system or other process which would cause the desired data to be sent to the printer. When the printing is finished, the printing process would typically send an event to the word processor indicating that the print operation has been completed.

The present invention includes a method of running multiple programs in a multi processing system in which an application receives most of its external input as events from a single source, the event queue. User initiated events, such as keystrokes or mouse movements, are put in the event queue. Other inputs, such as communication events, file I/O completion events, and others are also put into the application's event queue. The present invention includes a novel method of managing input to a program or process by means of classifying events both as to their type and function. This allows an application a great deal of flexiblity in responding to inputs from a user or other processes running concurrently. Additionally, the present invention includes a novel method for properly directing user input in a multi-processing system to the proper process, which method has advantages over previous ways of routing user input.

For a proper appreciation of the present invention, it is necessary to understand the types of data structures used to describe events. The following data structures are described and shown in the appended listings as they would be implemented using the C language. The translation of such data structures to other languages is within the ordinary skill of those in the art, and the description of the present invention in terms of a particular language should not be construed to be a limitation thereon.

The generalized description of an event is shown in Listing 1 and is comprised of a defined structure identified as UIVREC. The event record includes a "type" entry which defines the particular type of event designated by the event record. Event types will be discussed below, and in the present embodiment includes several different event types which may be distinguished.

The event record also includes a "data" variable which includes the data which describes the event. This data may include a pointer to additional information, such as a message or the actual data transferred from a file I/O operation, which may be associated with the event. The structure of this variable depends upon the particular event and is defined in terms of a union of data structures identified as UIVDATA and described in more detail below.

A "timestamp" variable indicates the time at which the event was put into an application's event queue and serves to provide a chronological indication of event occurrences. Other data may be added to the event record, such as the "flags" entry shown in Listing 1, which could be used to contain further information about an event.

The following explanation defines a number of different types of events. It should be clear that additional types may be added where they are required. The following is a brief description of each of these types of events.

Listing 2 shows the definition and structure of the UIVDATA structure which is used to define the data variable in the event structure of Listing 1. The event data is defined as a union of the data structures required to define each of the different event types. The user event data structure, UIVUSER, and the window event data structure, UIVWINDOW are explained in more detail below. For applications using other event types, it may be necessary to include additional data structures in the union shown in Listing 2. The following is a brief description of the event types shown in Listing 2.

User events would include all events which are initiated directly by a user. These events would include key strokes, function keys, mouse movements, and other events which are directly executed by a user. User events also include actions which are indirectly performed by a user. An example of such an action would be a pull-down menu selection. Such an action would be initiated by a user in response to keys or mouse movements, which themselves would be events. The final result of the keys and mouse movements in a pull-down menu selection would be an event of that type indicating the function to be performed. It should be noted that a single key stroke and a pull-down menu selection operation may have the same meaning to a program. The data structure for a user event is shown in Listing 3, discussed below.

Window events are issued by a window manager process when an application's window has been affected by a user's operation. For example, a window size could be changed, a window could be closed, or other operations could be performed. The data structure for window events is discussed below in connection with Listing 4.

Timer events indicate the expiration of an interval. When a process sets up a timer, the expiration of the timer causes the appropriate event to be put in that processes' event queue. The data includes an integer which defines the particular timer which has expired.

File I/O events include internal events generated by all file I/O operations. The data includes two long integers which identify the particular I/O operation which has been completed.

Application-defined events are provided which allow events to be sent between cooperating applications programs which are separate processes and which wish to send information to each other as events. The data associated with these events are arbitrary 12 byte strings.

Message events are generated whenever messages arrive on an open connection or when connection operations are being performed. The event data record contains information about the connection and the type of message, and a pointer to the message itself. Message events would include, for example, electronic mail sent between users on a multi-user system.

Message buffer events are generated whenever message services have filled an application message buffer or whenever a destination mail box becomes free after a failed attempt to send a message to it. The event data record contains information which describes the connection or mail box in the buffer which has been affected. As will become clear below, an application can distinguish between different types of events. Message buffer events may well require different and more urgent responses than normal message events and are thus given a separate event type to allow an application to appropriately respond to this class of events.

Child process termination events indicate that a child process, initiated by a parent process, has completed. The data includes the process I.D. of the terminated process and a termination parameter.

Listing 3 defines the structure which contains data for user events. User events come in 1 of 4 sub-types: keystroke events, mouse movements, region notifications, and pull down menu selection events. The "type" variable of the UIVUSER record indicates which of these 4 sub-types the user event data is. The UIVUSER "code"

variable is a 16 bit variable which uniquely defines the event. For example, each key will have an individual code indicating that the event is a key stroke corresponding with that key. Cursor keys, function keys, and other keys will also have their own specific codes, which are defined by the system. Thus, an application need only examine the UIVUSER code variable to determine the information necessary to process the user event. However, additional data is provided, which more particularly describes the event and how it was initiated by a user, in the remaining portions of the UIVUSER data structure. Thus, an application is able to determine, for example, whether a particular function, as indicated by the UIVUSER.code variable was initiated by a single key stroke or by a menu selection. Encoding user data events in this manner allows an application to rapidly process user event data while still providing detailed information on the event for those applications requiring it. For example, a program might be written which would allow a user to select functions by either going through the menu system or activating a single function key. A user could select, for such a program, a mode in which a beginning user is automatically reminded of the corresponding function key when a particular function is selected through menus. Such a program would require additional data to the UIVUSER.code value in order to determine how a user's selected a particular operation.

Listing 4 shows the structure used to define a window event. The "type" variable includes a code which indicates the window operation being performed, such as move, refresh, resize, close, etc. The other parameters are explained by the comments in Listing 4.

An application receives input by requesting that it be notified of events in its event queue. An event is requested by means of a call to the system, which calls are discussed below, in conjunction with an event specification. The event specification allows the applications program or calling process precise control over the types of events which it may request. Listing 5 is the definition of a specification structure UIVSPEC which is used in the function calls discussed below. As discussed below in detail, the function calls operate by comparing one or more specification structures supplied by the calling program in the format shown in listing 5 with the events in that process's event queue, and matching events are returned. The "type" variable in Listing 5 identifies the event type, as discussed above, and is frequently the only data required in the UIVSPEC structure to identify a match. In order to allow multiple types of events to be requested, the following function calls normally define an event type by means of an array of specifications structures such as that shown Listing 5. The end of such an array is indicated by means of an end-of-list terminator value stored in the type variable of the last UIVSPEC structure.

Sometimes additional specification of an event structure may be necessary. The "data" variable of UIVSPEC allows further specification for those types of events whose data is a single long integer such as for timer events. For event types requiring still more data, the "spec" union may used. The "action" and "action data" variables are provided to support high-level packages which process events and allow the specification of an event list which indicates what is to be done when particular events occur. Such actions would be defined by the packages which support and use them.

The following is a description of several C function definitions which show how the above described event data structures would be used. It should be appreciated that most applications would include additional functions for manipulation and other operations on events in the event queue. The specific functions necessary will depend upon the size, speed, and capability of the processor and operating system being used, and the implementation of such functions is within the skill of those in the art in view of the present description.

The following is the definition of the UIvget function, which is used to retrieve functions from an application's event queue.

| UIvget(specp, wait, remove, eventp) | |
|---|---|
| UIVSPEC | *specp; |
| INT | wait; |
| INT | remove; |
| UNIREC | *eventp; |

The specp variable is a pointer to an array of UIVSPEC structures each specifying one or more events which may be returned. As set forth above, the last entry in the array should have the "type" variable set to a value which indicates that that specification ends the array. If the specp pointer is null, the first event in the event queue will be returned. The wait variable is a flag indicating whether the process should be blocked to wait for an event matching this specification if none is found in the queue. The remove variable is a flag indicating whether the event record is to be removed from the queue once found. The eventp variable is pointer to a UIVREC structure to receive the found event.

This function looks for an event in the event queue which matches the given specification. This specification may include one or more different specifications of the type shown in Listing 5 arranged as an array terminated with an empty specification, as discussed above.

The following function allows the calling process to put an event back into its event queue in the order specified by the event's time stamp.

| UIvrequeue(eventp, countp) | |
|---|---|
| UIVREC | *eventp; |
| ULONG | *countp; |

The event variable is a pointer to the UIVREC structure which contains the event to be placed back on queue. The countp parameter, if non-zero is a pointer to a variable to receive the number of events in the current process's event queue after this event is reposted. The UIvrequeue functions allows a calling process which has removed an event from the queue, but which does not wish to process the event, to return it to the queue so that it can be processed later. If requested, this function also returns the number of events in the event queue.

The following function allows a process to send an event to the event queue of another process.

| UIvpost(eventp, process, wait, countp) | |
|---|---|
| UIVREC | *eventp; |
| K_PROCESS | process; |
| INT | wait, |

-continued

| UIvpost(eventp, process, wait, countp) | |
|---|---|
| ULONG | *countp; |

The event parameter is a pointer to the UIVREC structure which defines the event to be posted. The process parameter is the process I.D. to which the event is to be sent. The wait parameter is a flag indicating whether the process blocked to wait for the event to be posted if the receiving processes event queue is full. The countp parameter, if not null, is a pointer to a variable to receive the number of events currently in the receiving processes event queue.

The following function will flush all events which match the given specification list from the event queue.

| UIvflush(specp) | |
|---|---|
| UIVSPEC | *specp; |

The specp parameter is a pointer to an array of UIVSPEC structures which specify the events to be flushed.

The following function allows a process to determine the number of events in another processor's event queue and the maximum number of events which that process may have in its event queue.

| UIvgtcount(process, countp, maxp) | |
|---|---|
| K-PROCESS | process; |
| ULONG | *countp; |
| ULONG | *maxp; |

The process variable is the process I.D. The countp parameter is a pointer to a variable to receive the number of events currently in the specified processor's event queue. The maxp parameter is a pointer to a variable to receive the maximum number of events which may be queued in the specified processor's event queue.

Referring to FIG. 1, there is shown a diagram which illustrates the flow of data and signals between the various portions of a typical system incorporating the present invention. In FIG. 1, keyboard driver 10 represents a process which accepts input data from a user, such as might be typed on a keyboard 12 or which might be indicated by manipulations of a mouse type device 14. Associated with keyboard driver 10 is a translation table 16, described in more detail below. The keyboard driver receives scan codes from keyboard 12 indicating the make and break status of each of the keys on the keyboard. In the described embodiment, these scan codes are 8 bites long. It also may receive data from a mouse 14 indicating mouse movements and activation of mouse buttons. It should be appreciated that other types of input sources, such as touch screen indicators may used in place of or in addition to the keyboard and/or mouse input devices illustrated in FIG. 1. The incorporation of such devices into the present invention is easily done by one of ordinary skill in the art.

The output from keyboard driver 10 is a key code which is 16 bytes in the described embodiment. Each key code is passed to a procedure 20 which will be referred to as the input funnel. The input funnel is responsible for assuring that the codes from keyboard driver 10 are routed to the appropriate process running on the system. This process might be an application program or alternatively may be a signal to the operating system indicating that certain functions are to take place. For example, a user running an applications program might desire to change the window size, and the keys indicating this change of window size would be sent to a window manager process, illustrated by block 30 in FIG. 1, which would carry out the appropriate steps in response to the users input. The input funnel 20 has associated with it a routing table 22, described in more detail below, and which includes data representative of the various processes to which the input funnel may send events.

In FIG. 1, a block 40 represents a first application program with which a user is interacting. In the described embodiment, a user may have several programs executing at one time. These programs will each have individual windows on the screen which may vary in size from a small icon, indicating that the program is loaded, to a larger window which displays data from the program. In the described embodiment, many windows may be present on the user's display simultaneously, reflecting the different programs and processes which may be running concurrently. However, input data from a user may be sent, to, i.e., put in the event queue 46 of, only a single process at one time. The process to which data may be sent is displayed on the screen in a window denoted as the "active window", as illustrated by dotted box 50 in FIG. 1. Additional applications programs 42 and 44 are illustrated in FIG. 1. These programs may be executing in the background or may be suspended, however, only the program 40 in the active window may receive user data from the keyboard. A user may send data to other applications by making another application's window active in place of the current active window. Selected keystrokes may be interrupted by the input funnel and put in the event queue of applications programs not in the active window and to other processes, as indicated by dashed lines 21, as described below.

The operating system in the described embodiment includes a window manager process 30 which controls the data displayed to a user on a device such as CRT display. Window manager 30 may control, for example, the number, size, location, and updating of various windows displaying the output from different programs to a user. The user communicates with window manager 30 via input from keyboard 12 or mouse 14. This input is applied via keyboard driver to input funnel 20. Input funnel 20 includes a routing table 22 which is used to identify those input events from the user which should be directed to the window manager 30. For example, a particular key, such as a function key, is typically defined to be the key which a user presses to interact directly with window manager 30. In response to the depression of this key, keyboard driver 10 will pass a key code representative of that key to the input funnel 20. Input funnel 20 uses data in routing table 22 to identify this key as intended for the window manager process 30 and sends this key directly to the window manager. In response to a key intended for window manager 30, the input funnel 20 also sets a flag indicating that the window manager, has been called. While this flag is set, all further keyboard input is routed by the input funnel 20 to a typeahead process 60. This is necessary because the ultimate destination of keys typed after a window function is called may not be the application program which is currently in the active window. This is described in more detail below. Additional keys typed after the window manager has been called are sent by input funnel 20 to the typeahead process 60 and are stored in a typeahead buffer 62 pending the completion of the window operation. Typically, window operations require additional input to complete the operation, and window manager 30 will receive these additional key codes from typeahead buffer 60, as described in more detail below. Thus input funnel 20 in conjunction with typeahead process 60 ensures that keys typed by a user after the initiation of a window event are sent to the correct destination.

Figure 2:
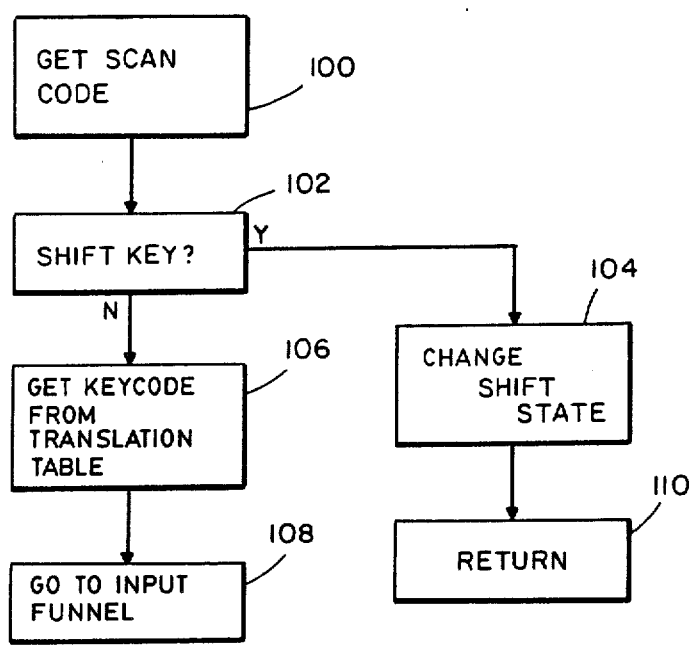
FIG. 2 is a flow diagram representing the steps carried out by the keyboard driver.

The operation of keyboard driver 10 is similar to known types of keyboard device drivers, with one exception discussed below. The functions performed by keyboard driver 10 are shown generally in FIG. 2. It should be appreciated that the specific program code needed to implement these functions will vary, depending upon the particular programming language and computer processor being used. In the described embodiment, keyboard driver 10 is interrupt driven in response to the depression of a key, although it could equally well be called by being polled.

Keyboard driver 10 first receives a scan code sent by keyboard 12 in response to the depression or release of a keyboard key, block 100. In the preferred embodiment, the scan codes from the keyboard are 8 bytes long, giving 256 possible different scan codes. The following description assumes operation of the keyboard driver wherein a single key code is sent in response to the depression of the key, and no key code is sent upon the release of the key. Additionally, the keyboard driver may be designed so that holding a key down for a predetermined period will cause the keyboard driver to send multiple key codes representative of that key to provide an automatic repeat key function. In some circumstances, it is desirable to provide a keyboard output representative of when a key is depressed and when it is released, also known as typeamatic action. The present invention may be used with such an implementation also, and such a modification with the embodiment described herein is within the capabilities of one ordinary skill in the art.

Following receipt of a scan code from the keyboard, block 100, the keyboard driver checks the scan code to determine whether the depressed key is a shift key, block 102. Shift keys serve to modify the meaning of a subsequently depressed key, and include keys such as upper case shift, control, ALT, and others. Additionally, combinations of shift keys may be used. In the present embodiment, 10 different shift keys and combinations are defined.

Other key combinations may be defined which have special functions or meanings to the system or a process. For example, it is typical to define a three key combination to reboot the computer or workstation. Although not shown in FIG. 2, these combinations may be identified in block 102 and the appropriate operational function carried out in response thereto.

If the depressed key is a shift key, the keyboard driver proceeds to block 104 where it changes the shift state. The keyboard driver process then ends and the keyboard driver returns to the previous routine, block 110. If the keyboard driver determines that the depressed key is not a shift key, it proceeds to block 106 where the keyboard driver gets the appropriate key code from translation table 16 and forwards it to the input funnel at 108.

Figure 2A:
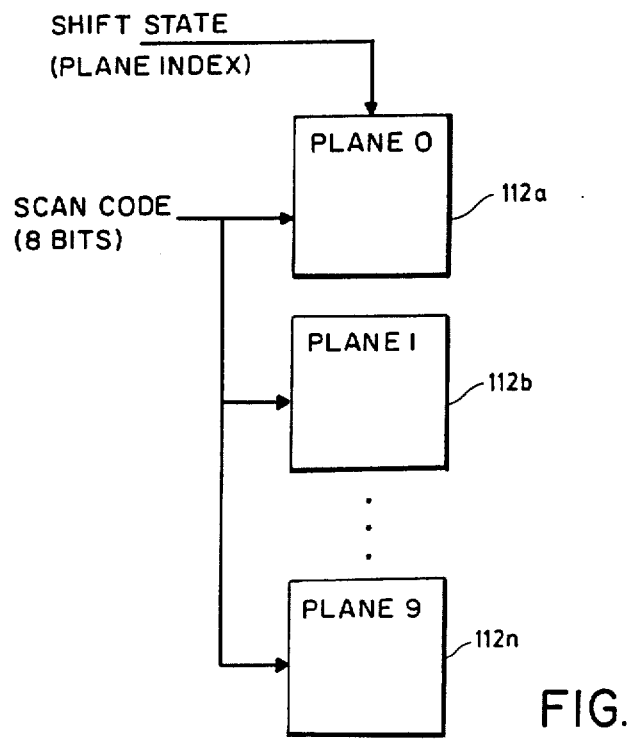
FIG. 2A is a diagram showing the organization of the translation table used by the keyboard driver.

Referring to FIG. 2A, there is a diagram which shows how the translation table is implemented in the present embodiment. The translation table includes a plurality of planes 112a, 112b and 112n each of which represents a different shift state. Within each plane are stored the key codes which are to be generated in response to the activation of each non-shift key. Thus, the shift state provides an index into the translation table while the scan code from the activated key provides the offset. In the described embodiment, each of the key codes stored in translation table 16 is composed of 16 bits.

It should be appreciated that storing the key codes in the manner described above allows an arbitrary number of different shift states to be defined while requiring memory only for those planes, or shift states, which are, in fact, being used by a particular process or application program. Furthermore, the translation table maybe changed to accommodate the requirements of different programs. Thus, by writing new data into translation table 16 used by keyboard driver 10, different key codes will be produced by the keyboard driver in response to keys pressed by a user. In the present embodiment, window manager 30 controls which application is in the active window 50, and thus which application is responding to keys typed at the keyboard by a user. When a user switches the active window from one application program to another application program, window manager 30 will, if required, replace the translation table 16 in keyboard driver 10 with a new translation table suitable for the new application program. After the proper key code has been determined from translation table 16, the keyboard driver goes to the input funnel routine 108, shown in more detail in FIG. 3.

Figure 3:
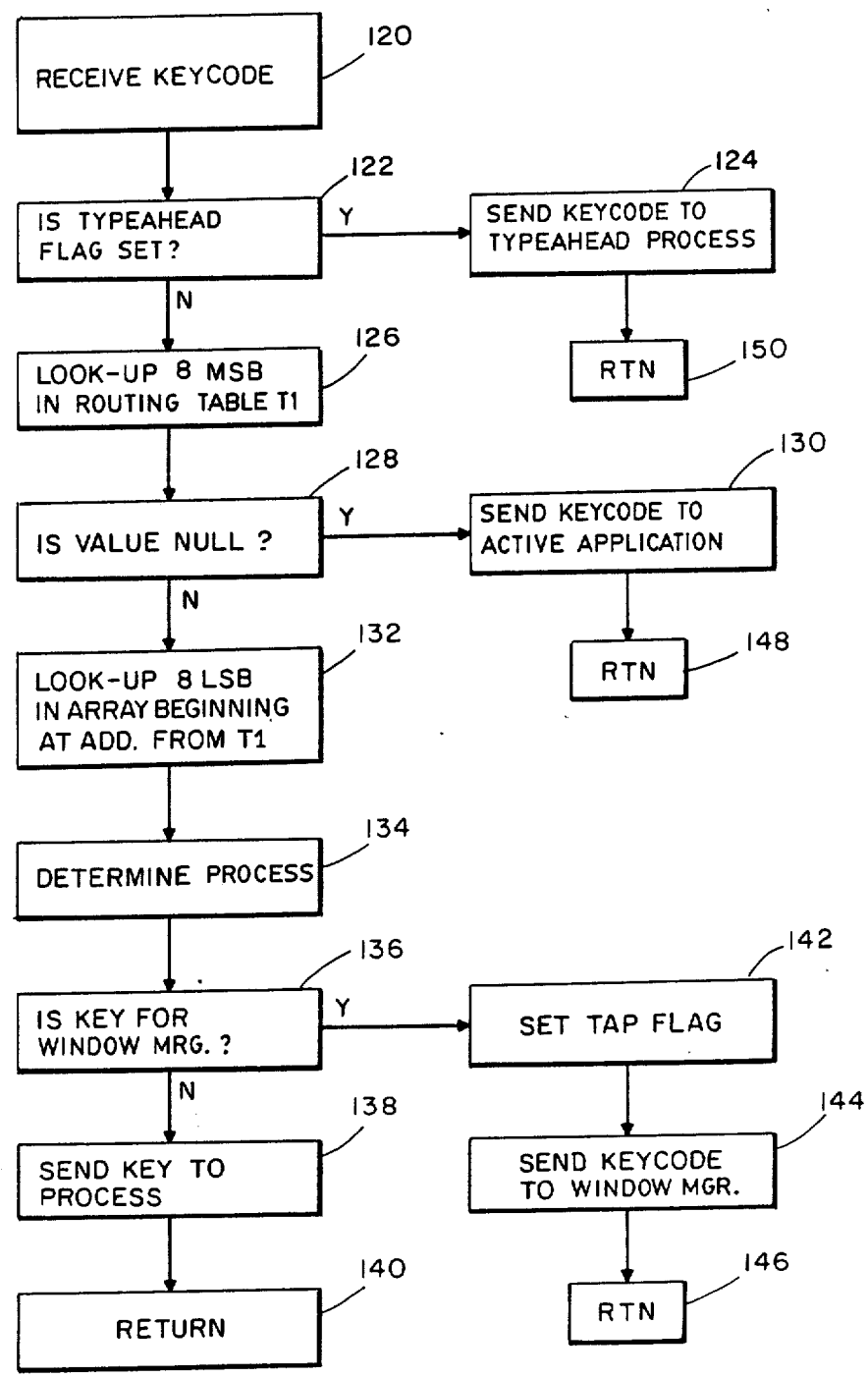
FIG. 3 is a flow diagram representing the steps carried out by the input funnel.

FIG. 3 shows the functions performed by the input funnel. After receiving a key code, block 120, from the keyboard driver, the input funnel checks the typeahead flag to see whether or not it is set, block 122. If so, the input funnel sends the key code to the typeahead process, block 124, described in more detail below, followed by a return 150. Otherwise the input funnel looks up the key code in the routing table, block 126. The structure of the routing table is shown in more detail in FIG. 3A.

Figure 3A:
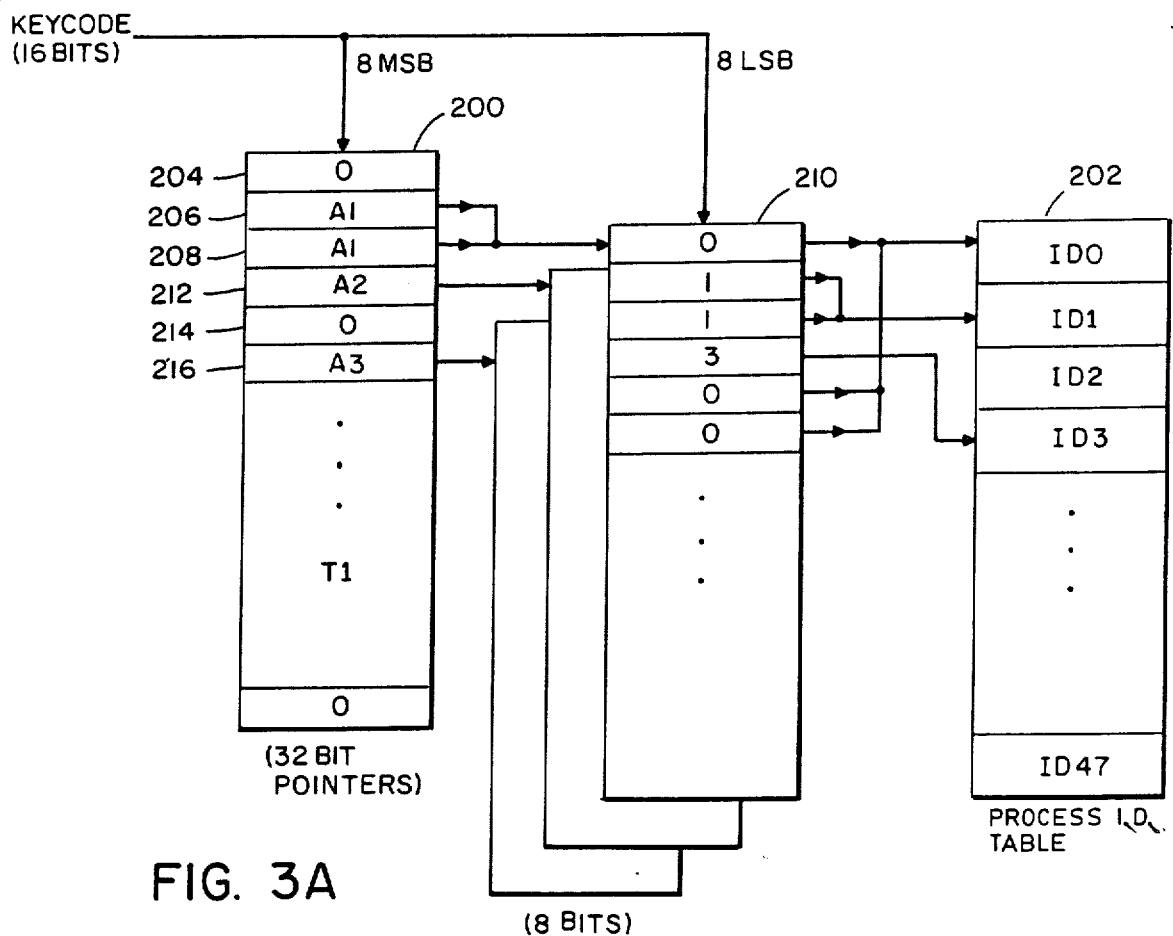
FIG. 3A is a diagram showing the organization of the routing table used by the input funnel in conjunction with the process I.D. table.

The input funnel first takes the 8 most significant bits of the 16 bit key code and uses that value as an index into a first table 200 identified as T1 in FIG. 3A. Table T1 includes 256 entries each of which consists of a pointer to the beginning of a secondary table elsewhere in memory described below. In the described embodiment, the pointers in table T1 are 32 bits long.

If the value within table T1 is a null, or 0, value, block 128, the input funnel sends the key code directly to the application program, at block 130, which is currently running in the the active window. A return 148 follows. A process I.D. table 202 is kept by the system which gives the process identification numbers for all of the currently active processes. In the described embodiment, up to 48 different processes may be active at one time. The process I.D. in the first table entry is always that of the application running in the active window. The process I.D. in the second table entry is that of the window manager process 30.

If the value in table T1 is other then null, the input funnel uses the 32 bit pointer as an index to a 256-byte secondary table and uses the 8 least significant bits as as an offset into that table, block 132. Referring to FIG. 3A, the first entry 204 in table T1 is null. This indicates that the key code should be sent directly to the process in the active window, and thus no secondary table is required. The second entry 204 in table T1 is an address value designated as A1. This address indicates first entry in a secondary table 210. The input funnel takes the 8 least significant bytes of the key code and uses that as an offset into table 210.

Table 210 and each of the other secondary tables which may be stored each include a numerical value between 1 and 48 which indicates the process to which the key code will be sent. After looking up the process number in the appropriate secondary table, the input funnel refers, block 134, to the process I.D. table 202 to find the process I.D. number which is used to inform the system of the process to which the current key code event is to be sent, block 138. Once the key code is sent, the input funnel returns, block 140.

It should be appreciated that the above described procedure results in a sparse array for the translation table in which a primary table T1 and one or more secondary tables are stored to identify key codes which are sent to processes other than the currently active application. The values in the secondary tables indicate the process to which the key code is sent. A value of 0 indicates that the key code is to be sent to the currently active application. Thus, a key code having the 8 most significant bytes equal to a value other than null may still be sent to the active application if the corresponding entry in the appropriate secondary table is 0.

A value of 1 in the secondary table indicates that the key code is to be sent to the window manager. This is a special situation which causes the input funnel to activate the typeahead buffer. Thus, if the input funnel determines that the key is for the window manager, block 136, the input funnel sets a typeahead process flag, block 142, and sends the key to the window manager, block 144, followed by a return 146. The next time the input funnel is called, the typeahead flag is detected in block 122, and all further keyboard input is sent to the typeahead process, block 124, as long as the typeahead process is active, as described below.

Figure 4:
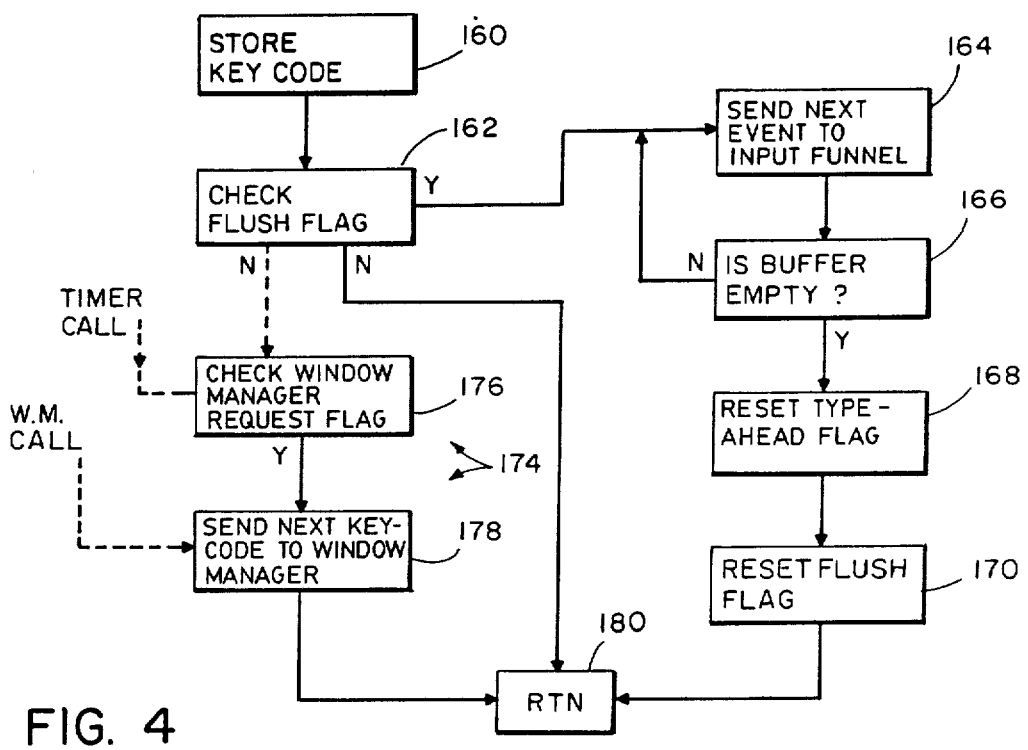
FIG. 4 is a flow diagram showing the operation of the typeahead buffer process.

FIG. 4 shows the steps carried out by the typeahead process 60. When it receives an event, the typeahead process stores the event in typeahead buffer 62, block 160. The typeahead process next checks a flush flag, block 162. The flush flag is set by the window manager and indicates that a window event has been completed and that all further key codes stored in typeahead buffer 62 are to be rerouted through the input funnel 20 to the appropriate application. Thus, if the flush flag is set, the typeahead process will send the next event in the typeahead buffer to the input funnel, block 164.

Typeahead process 60 next checks to determine whether the typeahead buffer is empty, block 166. If not, it returns to block 164 and sends the next event in the typeahead buffer to the input funnel. If the typeahead buffer is empty, the flush flag is reset, block 170 and the typeahead process resets the typeahead flag, block 168, in the input funnel (checked in block 122) to cause the input funnel to resume sending user events directly to their destination, rather than to the typeahead process, block 170. A return 180 follows.

If the flush flag is not set, block 162, the typeahead process may return as soon as the key code is stored in the typeahead buffer 62. Alternately the typeahead process may proceed to block 176.

A first key code which is identified as being intended for the window manager 30 is sent directly by the input funnel to the window manager process, block 144. Normally, a window function will require further key strokes from a user for completion. These key strokes are provided by the typeahead process by a routine shown generally at 174. This routine may be entered immediately following block 162, it may be periodically activated by a polling routine, or it may be called by the window manager 30 when the window manager determines that it needs an additional key. If called by other than the window manager, the typeahead process checks the window manager request flag, block 176 to determine whether it should send a key code to the window manager. If so, or if the typeahead process is called directly by the window manager, it sends the next event in the typeahead buffer 62 to window manager, block 178.

Figure 5:
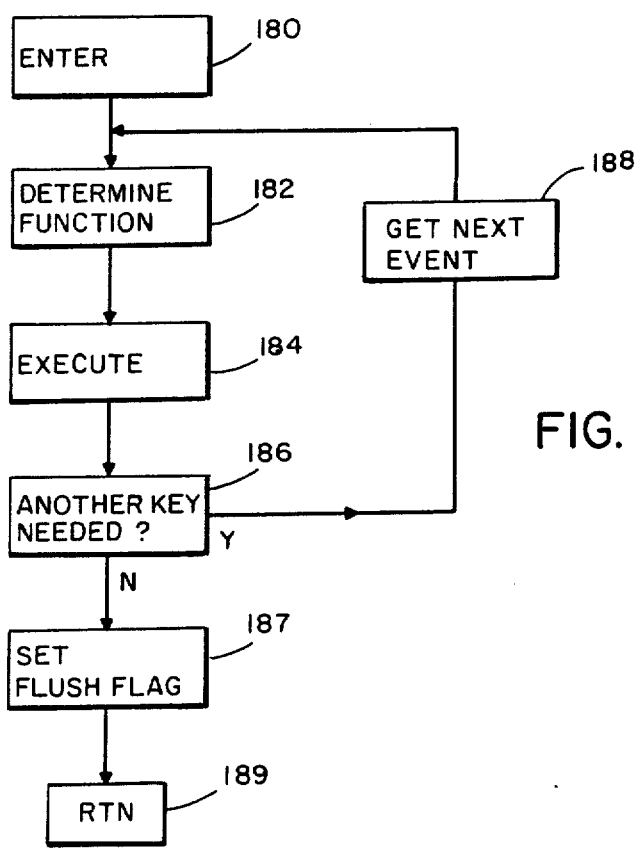
FIGS. 5 and 6 are flow diagrams showing the major functions of the window manager process.

The functions performed by the window manager 30 will vary depending upon the particular type of program being run, the complexity of the window structure, and other parameters related to the hardware and software of a particular system. The implementation of these different functions is well within the ordinary skill of those in the art. FIG. 5 shows certain portions of routines which will be carried out by window manager process 30 and which interrelate with the above described functions.

The window manager is called up by a user by the depression of a key corresponding to a window function. This key is recognized by the input funnel based on data in the keyboard translation table 16 and the input funnel routing table 22, as described above. After the window manager routine is begun by the depression of a window function key, block 180, the window manager next determines the appropriate action to be carried out in response to that key, block 182. The window manager executes the appropriate steps block 184 and then determines whether another key or event is needed for further execution, block 186.

Some window functions may be accomplished with a single key stroke. For example, a window close function may be activated with a single key stroke. Other window functions may require more than one key. For example, a window resize function will require that the window manager be called up, the resize operation be initiated, and then the window manager will request cursor key strokes or mouse movements and buttons from the typeahead process in order to receive input from the user as to the particular resize operation. In such cases, the window manager will determine that it needs additional input to complete the operation, block 188, and will repeat the above described sequence of operation until it determines that the window operation is complete, block 186. The flush flag in the typeahead process is set, block 187, and the window manager returns, block 189.

In carrying out the above described operations, the window manager may change the application running in the active window. In this case, the sequence of steps shown in FIG. 6 would be carried out. This sequence may be integrated as part of the execution of the window function being performed in block 184, or it may be located elsewhere in the window manager functioning.

Figure 6:
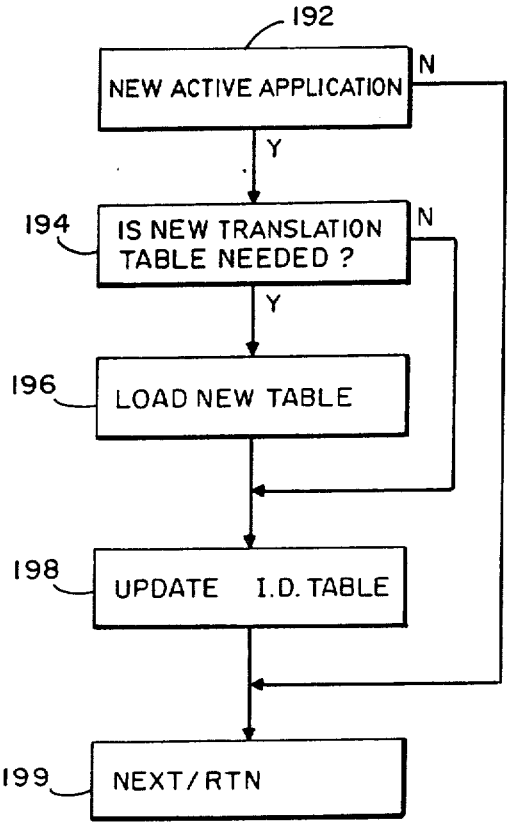

In FIG. 6, the window manager first checks to determine whether a new application has been made active, block 192. If not, the following steps are skipped, and the window manager proceeds to return or to carry out the next function, block 199. Otherwise, the window manager will check to determine whether a new translation table is needed, block 194. A default translation table is provided by the operating system, and many, if not most, applications programs will use the default key translation table. In this case, a new translation table does not need to be loaded. However, where an application requires a new translation table, the window manager will load the appropriate translation table when the new application becomes the active application, as shown in FIG. 6 at 196. Next, at 198, the window manager updates the process I.D table 202. As discussed above, the first entry in the process I.D. table always corresponds with the application running in the active window. Thus, any change of the application in the active window will require updating the process I.D. table.

Invocation of some applications programs will also require changes in the routing tables 22. As described above, user key strokes are sent either to the window manager or to the program running in the active window. Some programs may, however, perform functions in the background in response to particular keys or key combinations entered by a user. For example, a keyboard macroprogram may be activated by a user and record succeeding key strokes until deactivated by the user. A debugger program, as another example, may be activated or deactivated by a user while the program runs in the active window. Such programs when first invoked would call the system and would appropriately modify tables 200 and 210 so that the proper key codes would be sent as events to these operations operating in the background.

It should be appreciated that in applying the teachings set forth above, those of ordinary skill in the art will make modifications and additions which are within the scope of the present invention. Accordingly, the description herein of a preferred embodiment should not be taken as a limitation on the invention, but rather the invention should only be interpreted in accordance with the appended claims.

What is claimed is:

1. A method of routing user input in a computer system which concurrently runs a plurality of processes, including steps of:
   receiving scan codes representative of keys typed by a user, the scan codes including shift codes representative of shift states and other scan codes representative of keystrokes;
   maintaining a shift state representative of said shift codes;
   producing keycode data comprised of individual keycodes after receiving the scan codes, each representative of a keystroke, and each determined by looking up a scan code assigned to a keystroke in a multiplane table, a plane from which a keycode is determined being selected as a function of a current shift state;
   distinguishing the produced keycodes by looking up each keycode in a routing table which assigns each possible keycode to an individual assigned process of said plurality of processes, one of which processes is a supervisory process;
   sending each keycode to its assigned process until a keycode assigned to the supervisory process is received;
   sending keycodes received subsequent to the keycode assigned to the supervisory process to a buffer;
   then, providing additional keycodes to the supervisory process from the buffer upon request by the supervisory process until the supervisory process has completed operation; and
   sending each keycode stored in the buffer to a process to which it is assigned after the supervisory process has completed operation.

2. The method of claim 1 wherein the supervisory process includes a step of modifying the routing table to change an assignment between the keycodes and individual processes.

3. The method of claim 1 further comprising displaying windows from a plurality of processes, the supervisory process being a window manager which selects a process to be active and respond to predetermined keystrokes.

4. The method of claim 3 wherein the window manager includes a step of modifying the routing table to change an assignment between the keycodes and individual processes.

5. A method of routing user input in a computer system which concurrently runs a plurality of processes, including steps of:
   generating keycodes representative of keys typed by a user;
   distinguishing generated keycodes by looking up each keycode in a routing table which assigns each possible keycode to an individual assigned process of said plurality of processes, one of which processes being a supervisory process;
   then, sending each keycode to its assigned process until a keycode assigned to the supervisory process is received;
   sending keycodes received subsequent to the keycode assigned to the supervisory process to a buffer;
   next, providing additional keycodes to the supervisory process from the buffer until the supervisory process has completed operation; and
   sending keycodes stored in the buffer to processes assigned therewith after the supervisory process has completed operation.

6. The method of claim 5 wherein the supervisory process includes a step of modifying the routing table to change an assignment between the keycodes and individual processes.

7. The method of claim 5 further comprising displaying windows from a plurality of processes, the supervisory process being a window manager which selects a process to the active and respond to predetermined keystrokes.

8. The method of claim 7 wherein the window manager includes a step of modifying the routing table to change an assignment between the keycodes and individual processes.

* * * * *